United States Patent
Patin

[15] 3,698,502
[45] Oct. 17, 1972

[54] STABILIZED THREE-WHEEL VEHICLE
[72] Inventor: Pierre C. Patin, 58 rue de Sèvres, Boulogne-sur-Seine, France
[22] Filed: Aug. 7, 1970
[21] Appl. No.: 62,078

Related U.S. Application Data
[62] Division of Ser. No. 800,860, Feb. 20, 1969, Pat. No. 3,601,213.

[30] Foreign Application Priority Data
Feb. 22, 1968 France....................68140891
Feb. 7, 1969 France......................6902980

[52] U.S. Cl. ....................180/27, 180/41, 280/111, 280/282, 188/176, 188/329
[51] Int. Cl. .............................................B62d 61/08
[58] Field of Search .........180/27, 41; 280/112, 111; 188/329, 176, 177

[56] References Cited

UNITED STATES PATENTS
3,504,934  4/1970  Wallis................280/112 R X
2,878,032  3/1959  Hawke...............280/112 R X
2,819,093  1/1958  Geiser....................180/27 X
2,048,866  7/1936  Hunt....................280/112 R

FOREIGN PATENTS OR APPLICATIONS
929,051  5/1955  Germany....................180/27

Primary Examiner—Benjamin Hersh
Assistant Examiner—John P. Silverstrim
Attorney—Cameron, Kerkam & Sutton

[57] ABSTRACT

This invention is concerned with a stabilized three-wheel vehicle having a steering wheel at the front and two driving wheels at the back, wherein the vehicle comprises a chassis carrying the front steering wheel mounted on a fork with positive play, a rear framework having two driving wheels, and a member which will pivot around the substantially horizontal axis and is disposed between the chassis and the rear framework, a device sensitive to resultant of weight and centrifugal force being provited to enable the pivotal member to be locked.

9 Claims, 9 Drawing Figures

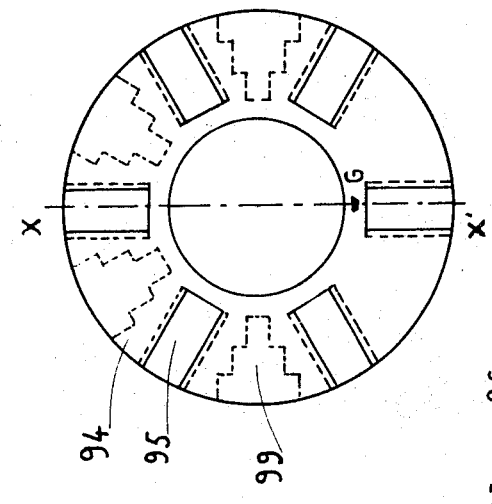
FIG:8
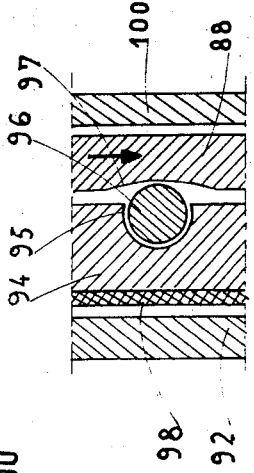
FIG:7
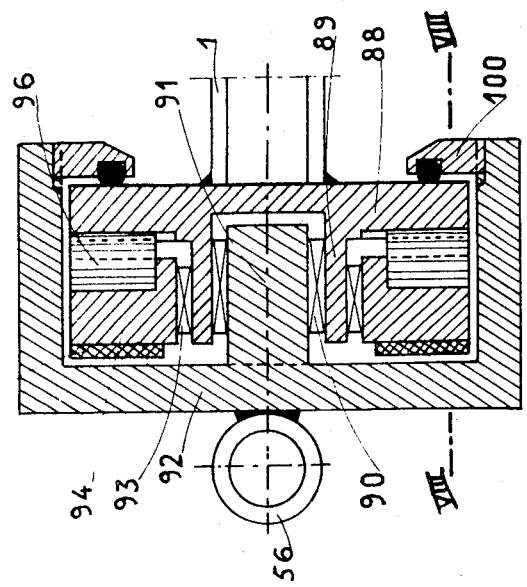
FIG:6

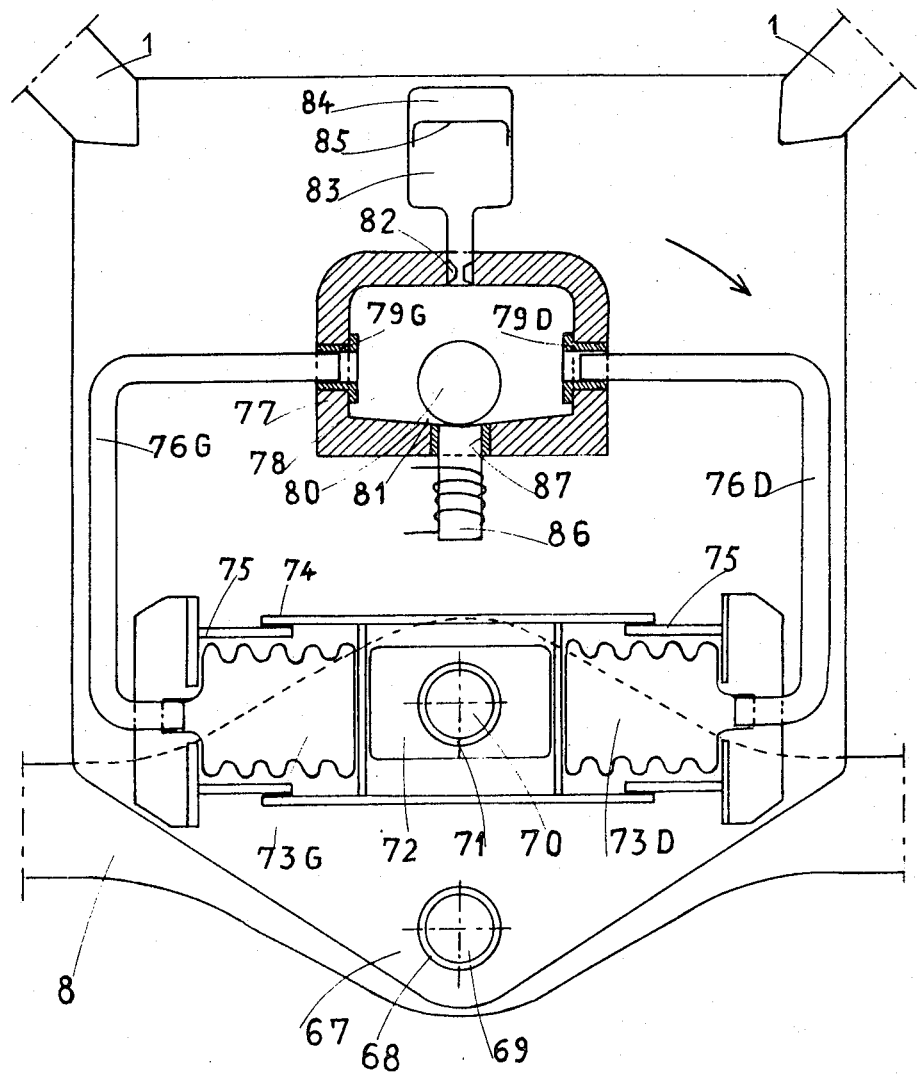
FIG : 9

STABILIZED THREE-WHEEL VEHICLE

REFERENCE TO RELATED APPLICATION

This application is a division of my U.S. application Ser. No. 800,860, filed Feb. 20, 1969, now U.S. Pat. No. 3,601,213 entitled Stabilised Three-Wheel Vehicle.

The invention relates to a stabilized three-wheel vehicle.

There are two kinds of stable vehicles.

The first kind comprises statically stable vehicles, i.e., vehicles having three, four, or even more wheels; these vehicles are always stable since the resultant of the forces applied to them, both when stationary and moving—in practice their weight and centrifugal force—always passes inside the supporting polygon.

The second kind comprises dynamically stable vehicles, i.e., two-wheel vehicles such as cycles and motorcycles, for instance, which are stable only from a certain speed onwards, the stability resulting from the combination of the rider's sense of balance with a mechanical device, the positive drive steering.

Two-wheeled vehicles move easily and can readily be parked since they take up only a small amount of space transversely; on the other hand, their instability at low speed and when stationary make them very uncomfortable since, as the rider is obliged to place his foot on the ground as soon as he stops, no seats or protective carriage work can be provided.

The invention relates to a vehicle of narrow width which can therefore be compared with two-wheeled vehicles, but which has considerable stability both when stationary and at low speeds.

The invention relates to a stabilized three-wheel vehicle, with one steering wheel at the front and two drive wheels at the rear, the vehicle being characterized by a chassis carrying the front steering wheel mounted on a fork with positive play, a rear framework fitted with two drive wheels, a member which pivots around the substantially horizontal axis and is disposed between the chassis and the rear framework, a locking device for the pivoting member, such pivoting member incorporating a part which can move freely within a housing integral with the chassis, under the effect of the weight and centrifugal force and which, when situated outside the center-plane, causes the member to be locked.

The invention will now be described in greater detail with reference to the exemplary embodiments illustrated in the drawings.

Figure 5:
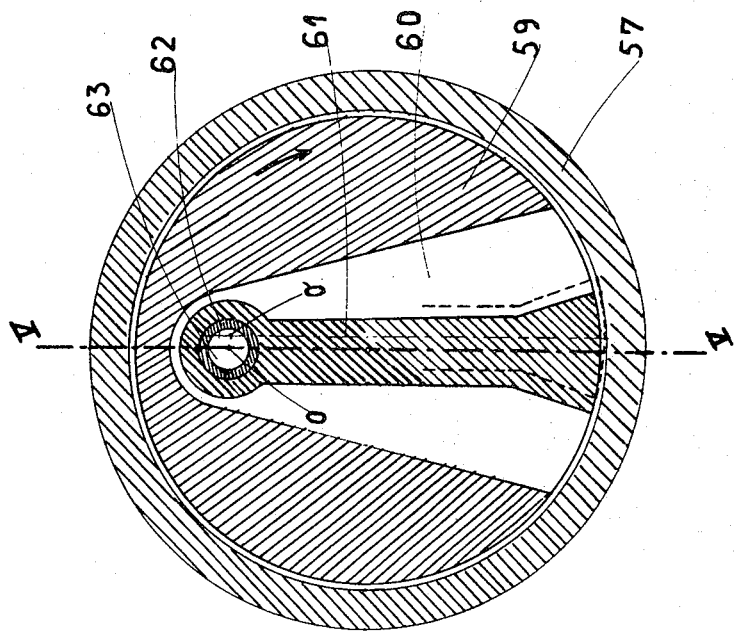
FIGS. 4 and 5 illustrate another variant of the locking device using a pendulum-governor.
Figure 4:
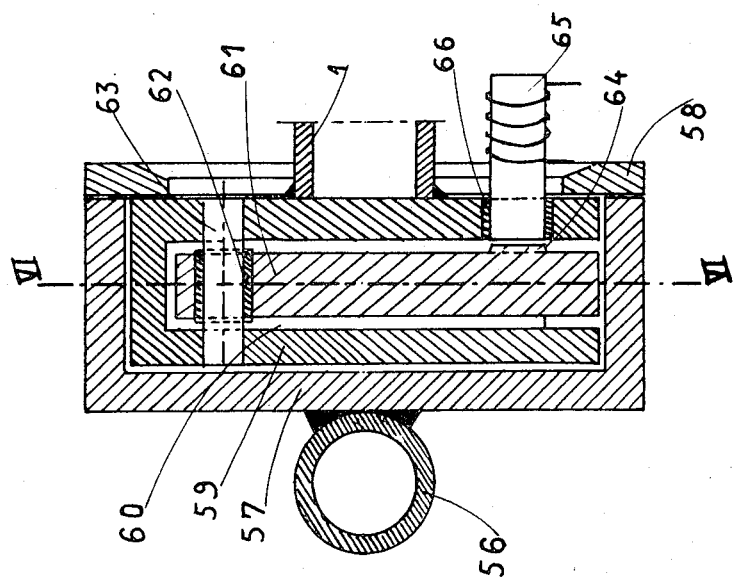

FIG. 4 being a longitudinal section taken along the line IV—IV in FIG. 5 and FIG. 5 being a cross-section taken along the line V—V in FIG. 4.

FIGS. 6, 7, and 8 illustrate another variant embodiment of the locking device using a roller bearing with helical ramps.

FIG. 6 is a longitudinal section taken through the axis of articulation.

Figure 2:
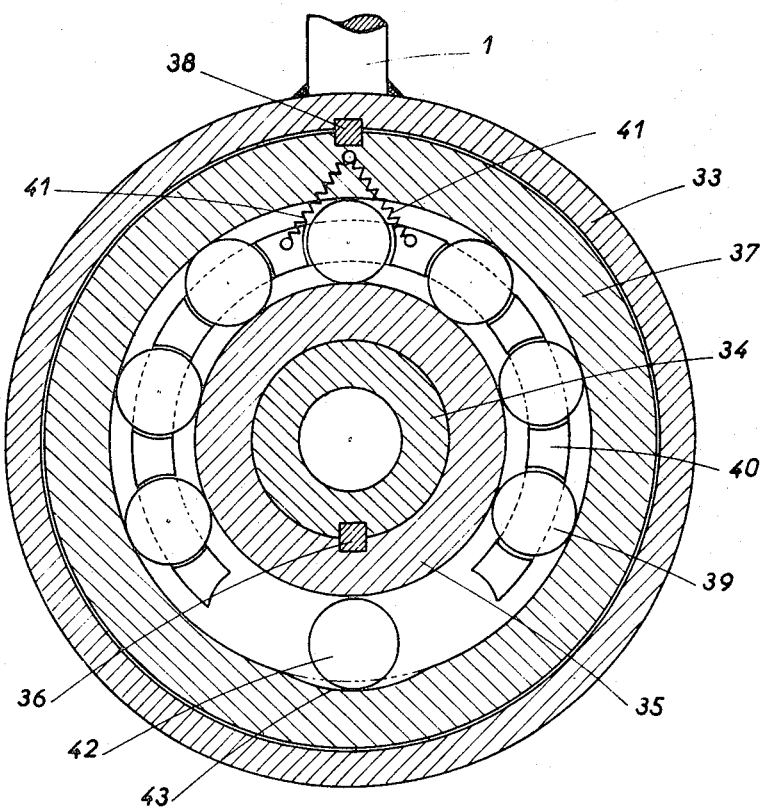
FIG. 2 is a vertical section, taken through a plane perpendicular to the driving shaft, of a variant embodiment of the pivoting member and its locking device taking the form of a bearing.

FIG. 7 is a partial section taken along the line VII—VII in FIG. 2. FIG. 8 is a separate front view of the plate integral with the chassis.

FIG. 9 shows another variant embodiment of the locking device, using a hydraulic system.

Figure 1:
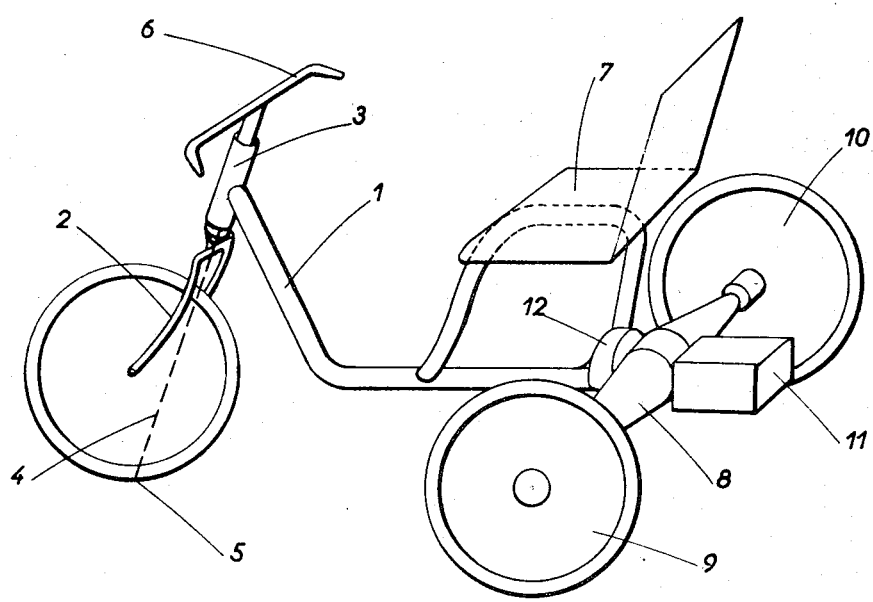
FIG. 1 is a diagrammatic perspective of a vehicle according to the invention.

FIG. 1 is a diagrammatic perspective of a vehicle according to the invention. This vehicle consists of a chassis 1 having at the front a fork 2 pivoting in a forwardly inclined bush 3, i.e., having a positive play.

The steering axis 4, diagrammatically shown by a broken line continued downwards, meets the ground at a point 5 where the wheel also touches the ground in normal position.

Handle-bars 6 enable the vehicle to be steered.

The frame has a seat 7 and is articulated to a rear framework 8 around a substantially horizontal axis.

The framework 8 comprises the axles of the rear wheels 9 and 10 and the differential. The rear axles are driven by an engine 11 attached to the framework 8.

According to the invention, a pivoting member 12 is placed between the chassis 1 and the rear framework 8 and a device is provided, combined with the pivoting member, to enable the latter to be locked.

FIG. 2 shows a special embodiment of the assembly formed by the pivoting member and the locking device.

The apparatus comprises a ring 33 integral with the vehicle chassis 1. A cylindrical bearing 34 is integral with the rear framework 8. The cylindrical bearing 34 is connected to the bearing ring 35 by means of a key 36.

Moreover, the other bearing ring 37 is connected to ring 33 by means a key 38. Bearing members 39 are placed between the two rings and retained by a bearing-cage 40. This cage is incomplete and is maintained in the central position by springs 41 attached at one end to the cage 40 and at the other end to the ring 37.

A bearing member 42, having a larger diameter than the members 39, is disposed at the lower part of the bearing at a place where the space left for the bearing member is larger than elsewhere. In the embodiment illustrated in FIG. 2, the outer bearing ring 37 is formed with a slight recess 43 to accommodate the bearing member 42 which is larger than the others.

The recess can be ellipsoidal or paraboloidal and can be connneected to the inner bearing path of ring 37.

The bearing member 42 has a diameter larger than the diameter of members 39 but slightly less than the maximum distance between the ring 35 and the bottom of the recess 43.

This apparatus operates as follows: the bearing member 42 always tends to place itself in the same direction as the resultant of the weight and centrifugal force.

If the plane of the chassis substantially corresponds to the direction of the resultant of weight and centrifugal force, the pivoting member is free. If, on the other hand, this plane deviates in one direction or the other, the bearing member 42 acts as in a roller-type freewheel and the outer ring 37 is locked. Therefore, when the vehicle stops, the chassis places itself in a nearly vertical position. The bearing members are preferably rollers.

Figure 3:
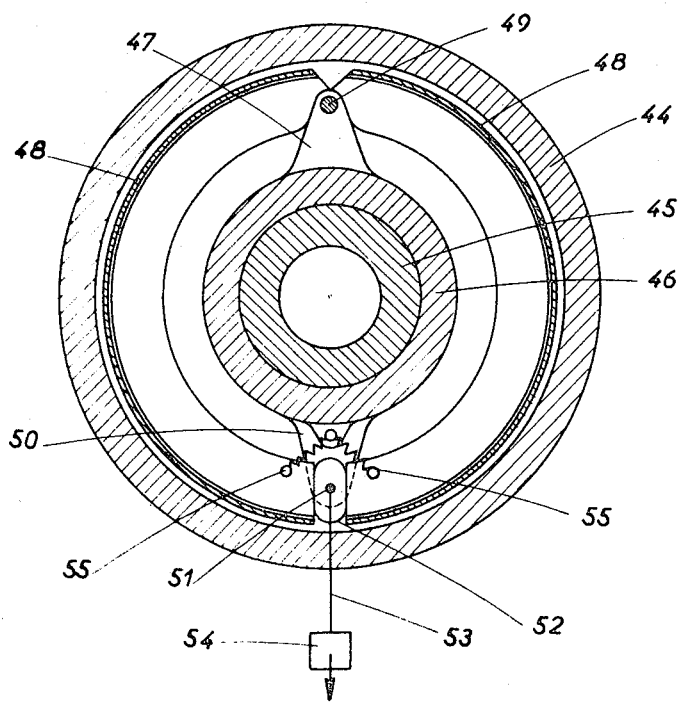
FIG. 3 is similar to the view shown in FIG. 2 and illustrates a variant embodiment taking the form of a brake drum.

FIG. 3 shows another variant embodiment which comprises a brake drum 44 integral with the rear framework and a bearing 45 also integral with the rear framework.

A sleeve 46, also integral with the vehicle chassis, carries two clevises: clevis 47 on which two brake-shoes 48 are articulated on a pivot 49 and a clevis 50 on which a cam 52, integral with a rod 53 carrying a weight forming a pendulum-governor, is articulated around a pivot 51.

The cam 52 is located between the two brake-shoes 48. These brake-shoes tend to press against the cam 52 by means of springs 53 fixed at one of their ends to member 46 which is integral with the vehicle chassis.

This apparatus operates as follows: when the central plane of the chassis which extends through the axis of articulation 49 of the brake-shoes and the axis of articulation 51 of the cam 52, does not coincide with the direction of the resultant of the weight and the centrifugal force, the cam 52 moves the brake shoes 48 apart and locks the pivoting member.

Referring to FIGS. 4 and 5, the rear framework of the vehicle, represented by the tube 56, is welded to a pan 57 closed by a lid taking the form of a circular rim 58 in which pivots a hollow member 59 which is integral with the vehicle chassis 1. This hollow member consists of a thick circular plate incorporating a recess 60, in which a pendulum-governor 61 can move. This pendulum-governor is articulated, through a lubricating ring or a needle bearing 62, to a pivot 63 carried by the hollow member and parallel with the articulation pivoting-axis. The pendulum 61 has a boss 64 which, in the axial position, stands opposite an electromagnet 65 magnetically insulated from member 57 by a brass ring 66 and fed by a tachometer d.c. generator (not shown) driven by the wheels.

In such a device if, when the vehicle stops, the chassis pivots in relation to the axle in the direction indicated by the arrow in FIG. 5, the center 0 of pivot 63 moves to 0' and the pendulum 61 moves to the position shown by the broken line and is locked on pan 57 thus stopping the rotation. When speed is adequate, the current generated by the tachometer generator creates a field between the electromagnet 65 and the boss 64. This field tends to render interdependent the movements of the pendulum 61 and of the hollow member 57, thus making the chassis independent of the axle. As shown in FIGS. 6, 7 and 8, the tube 1 representing the chassis is welded to a plate 88 pivoting thanks to the sleeve 89 (with which is it is solidary) and the needle bearing 93, on a nipple integral with a pan 92 welded to axle 56. A special member 94 pivots on the sleeve 89 by means of needle-bearing 93, the special member being formed by a thick plate incorporating recesses 95 which accomodate the rollers 96.

As shown in particular in FIG. 7, the plate 88 is formed with double helical ramps 97 equal in number to the number of the rollers of member 94 and facing these rollers.

Moreover, friction linings 98 are attached to the member 94 on the surface facing the bottom of pan 92. Member 94 is also provided with recesses 99, in a lesser number than the rollers, so that the center of gravity of the member 94 should be eccentric as shown in G on FIG. 4. As a result, member 94 always tends to rotate so that the axis X—X' is oriented in the direction of the centrifugal force.

A screwed cover 100 closes the pan 92 and permits adjustment of the clearance between the pan 92.

If, in a device of the kind specified, the central plane of the chassis moves away from the direction of the centrifugal force, the member 88 is displaced, for instance in the direction shown by the arrow in FIG. 7, and, by means of the ramp 97, causes the roller 96 to bear against recess 95 so that the member 94 bears, through lining 98, on the bottom of pan 92, thus forming with it a solid assembly.

Quite apart from its constructional simplicity, the latter type of articulation offers the advantage of being easily adjustable thanks to the screwed cover 100.

As shown on FIG. 9, the elements of the hydraulic locking system are attached to a plate 67 integral with chassis 1. The plate 67 carries a sleeve 68 which articulates the chassis 1 to a pivot 69 borne by the axle. The axle also carries a cylindrical nipple 70 which is articulated by means of a ring 71 in a slide 72 which moves between two metal bellows 73 $g$ and 73$d$ filled with oil or some other substantially incompressible liquid. The two bellows the compression of which is guided by sliding tubes 74 and 75, communicate with a distributor 77 through tubes 76$g$ and 76$d$.

The distributor consists of a cavity 78 communicating 36 with tubes 76$g$ and 76$d$ through orifices 79$g$ and 79$d$ forming valve seats. Each valve can be closed by a ball 80 moving along a double ramp 81. The distributor 77 is connected by a constricted orifice with an accumulator 83 containing inert gas 84 compressed by a diaphragm 85. An electromagnet 86, magnetically separated from the distributor 77 by a brass ring 87 and energized by a tachometer generator driven by the wheels (and not shown on the figure) is placed at the lower part of the double ramp 81.

In such a device as per the invention, when the vehicle stops and the chassis slants in relation to the axle, as shown by the arrow in FIG. 9 for instance the ramp 81 tilts to the right and the ball 80 closes the valve 79$d$. At the start of the slanting movement of the chassis, the bellows 73$g$ is compressed and the oil is forced back through the tube 76$g$, the distributor 77 and the tube 76$d$ towards the bellows 73$d$. As soon as the ball closes the valve 79$d$, the supply of oil to the bellows 73$d$ is interrupted and the movement of inclination locked. The shock of the locking is deadened by the supply of oil to the accumulator 83 in which the pressure is adjusted accordingly. When the vehicle runs at a sufficient speed to ensure dynamic equilibrium, the electromagnet 86 is fed under suitable voltage to maintain the ball in place in spite of the small relative movements of the chassis and the axle.

Of course, the invention is not limited to the embodiments described herein.

For instance, the pivoting member and its locking device might comprise various features of the variant embodiments described, with various combinations of such features.

Moreover, the pendulum shown in FIG. 3 might also control an electromagnetic locking or a hydraulic servo-mechanism for instance. Similarly, the freewheel might be of the rod or ratchet type, the ratchets being controlled by the pendulum.

Also, in the hydraulic locking device described in FIG. 9, the double ramp 81 might take the form of the arc of a circle, the movement of the ball thus corresponding more strictly to that of a pendulum.

I claim:

1. A stabilized three-wheel vehicle having a steering wheel at the front and two driving wheels at the back, comprising a chassis carrying the front steering wheel mounted on a fork with positive play, a rear framework mounting said two driving wheels and a member pivotally connecting said chassis and said framework for rotation about a substantially longitudinal horizontal axis between the chassis and the framework, a locking device for said pivotal member comprising a part moving freely in a housing, said housing being integral with the chassis, said part being normally positioned in the central plane of the chassis and moving in response to the effect of centrifugal force, whereby said part locks said pivotal member when centrifugal force causes said part to move outside the central plane of the chassis.

2. A vehicle as set forth in claim 1, wherein said device for locking said pivotal member includes a brake drum integral with said rear framework, brake shoes mounted on a member integral with said chassis, said part being a cam between said brake-shoes, mounted on said chassis and actuated by a pendulum-governor tightening said brake when said pendulum-governor diverges from said central plane.

3. A vehicle as set forth in claim 1, said device for locking said pivotal member including a cylindrical member integral with the chassis rotating inside a cylindrical pan integral with the rear framework, said part being a pendulum-governor articulated to the cylindrical member and having a length greater than the internal radius of the pan, the axis of articulation of the pendulum-governor being in the central plane of the chassis and parallel with the pivotal axis of the chassis on the rear framework, the end of the pendulum-governor skimming the inner surface of the pan when the central plane of the chassis is vertical, and means for locking the pendulum-governor in the central plane of the chassis.

4. A vehicle as set forth in claim 3, said locking means for the pendulum-governor being an electromagnet in the central plane of the chassis and a core for said magnet spaced from the pendulum-governor, the electro-magnet being energized by a current from a tachometer generator driven at a speed proportional to that of the vehicle.

5. A vehicle as set forth in claim 1, said device for locking the pivotal member includes a circular plate integral with the chassis and rotating in a cylindrical pan integral with the rear framework, the plate having hollow radial tracks forming double helical ramps on its face towards the inside of the pan, the surface facing the end of the pan being formed with radial recesses, rollers in said recesses in the same number and at the same angular distance as the plate tracks, said part being a circular coaxial member having an unbalance facing said plate in said pan whereby, in its equilibrium position, each roller is opposite a track in the plate when the central plane of the chassis coincides with the direction of the centrifugal force.

6. A vehicle as set forth in claim 1, said device for locking the pivotal member includes a plate integral with the chassis and articulated to the rear framework, a finger integral with the rear framework, two resilient chambers mounted on the plate and symmetrically in contact with the finger, pipes interconnecting the two chambers to an accumulator for pressurized fluid and to a gravity-operated ball distributor, said part being the ball of said distributor opening all the pipes for communication when the central plane of the chassis coincides with the direction of the centrifugal force and closing by gravity the piping of the chamber under negative pressure when the chassis is inclined to the vertical, and means in the distributor to immobilize the ball in a neutral position.

7. A vehicle as set forth in claim 6, the ball of the distributor being steel and said means for immobilizing the ball in the neutral position being an electromagnet integral with the distributor at the neutral point of the movement of the ball and supplied by a current produced by a tachometer generator driven at a speed proportional to the speed of the vehicle.

8. A vehicle as described in claim 1, said device for locking said pivotal member including a cylindrical drum secured to said rear framework and centered on said substantially horizontal axis and said locking device being connected to and rotating with said chassis frictionally engaging said drum and said part being a pendulum actuating said locking device on movement on either side of the medial plane of said chassis by gravity and centrifugal force.

9. A vehicle as described in claim 1, said device for locking said pivotal member including a friction drum connected to said rear framework, two friction shoes mounted on said chassis, said part being a cam mounted on said chassis engaging between said shoes and a pendulum secured to said cam rotating said cam against said shoes and moving said shoes into engagement with said drum when said pendulum moves from an equilibrium position.

* * * * *